(12) United States Patent
Kowalski et al.

(10) Patent No.: US 9,712,013 B2
(45) Date of Patent: Jul. 18, 2017

(54) WINDING WITH A COOLING CHANNEL FOR AN ELECTRICAL MACHINE

(71) Applicant: Siemens Aktiengesellschaft, Munich (DE)

(72) Inventors: Waldemar Kowalski, Mulheim an der Ruhr (DE); Christoph Lehmann, Neukirchen-Vluyn (DE)

(73) Assignee: Siemens Aktiengesellschaft, Munich (DE)

( * ) Notice: Subject to any disclaimer, the term of this patent is extended or adjusted under 35 U.S.C. 154(b) by 163 days.

(21) Appl. No.: 14/415,587

(22) PCT Filed: Jun. 21, 2013

(86) PCT No.: PCT/EP2013/062986
§ 371 (c)(1),
(2) Date: Jan. 18, 2015

(87) PCT Pub. No.: WO2014/019767
PCT Pub. Date: Feb. 6, 2014

(65) Prior Publication Data
US 2015/0188373 A1 Jul. 2, 2015

(30) Foreign Application Priority Data
Jul. 30, 2012 (EP) .................................... 12178424

(51) Int. Cl.
*H02K 9/00* (2006.01)
*H02K 3/00* (2006.01)
*H02K 3/24* (2006.01)
*H02K 3/12* (2006.01)

(52) U.S. Cl.
CPC ................. *H02K 3/24* (2013.01); *H02K 3/12* (2013.01)

(58) Field of Classification Search
CPC .................................. H02K 3/24; H02K 9/02
USPC ....... 310/55, 56, 60 A, 61, 58, 59, 200, 201; 174/15.6
See application file for complete search history.

(56) References Cited

U.S. PATENT DOCUMENTS

| 2,664,512 | A | 12/1953 | Huntley |
| 5,685,063 | A | 11/1997 | Andrew et al. |
| 6,459,180 | B1 | 10/2002 | Hattori |
| 6,956,313 | B2* | 10/2005 | El-Gabry ................. H02K 3/12 310/179 |

(Continued)

FOREIGN PATENT DOCUMENTS

| DE | 19543392 C1 | 12/1996 |
| EP | 1742330 A1 | 1/2007 |
| EP | 1742330 B1 | 9/2009 |

(Continued)

OTHER PUBLICATIONS

CN Office Action dated Jul. 6, 2016, for CN application No. 201380040846.1.

*Primary Examiner* — Jose Gonzalez Quinones
(74) *Attorney, Agent, or Firm* — Beusse Wolter Sanks & Maire

(57) ABSTRACT

A winding for an electric machine is provided. The electric machine includes conductor bars which are arranged one above the other and each of which has a cooling slot. The conductor bars are designed such that the height of the conductor bars increases in the radial direction and the effective cooling cross-section decreases in the radial direction.

4 Claims, 1 Drawing Sheet

(56) References Cited

U.S. PATENT DOCUMENTS

2002/0053838 A1     5/2002   Okuda
2005/0275304 A1    12/2005   El-Gabry et al.

FOREIGN PATENT DOCUMENTS

| EP | 2403110 A1 | | 1/2012 |
|---|---|---|---|
| FR | 895448 A | | 1/1945 |
| JP | H02139450 U | | 11/1990 |
| JP | 10285853 A | * | 10/1998 |
| JP | 2004236376 A | | 8/2004 |

\* cited by examiner

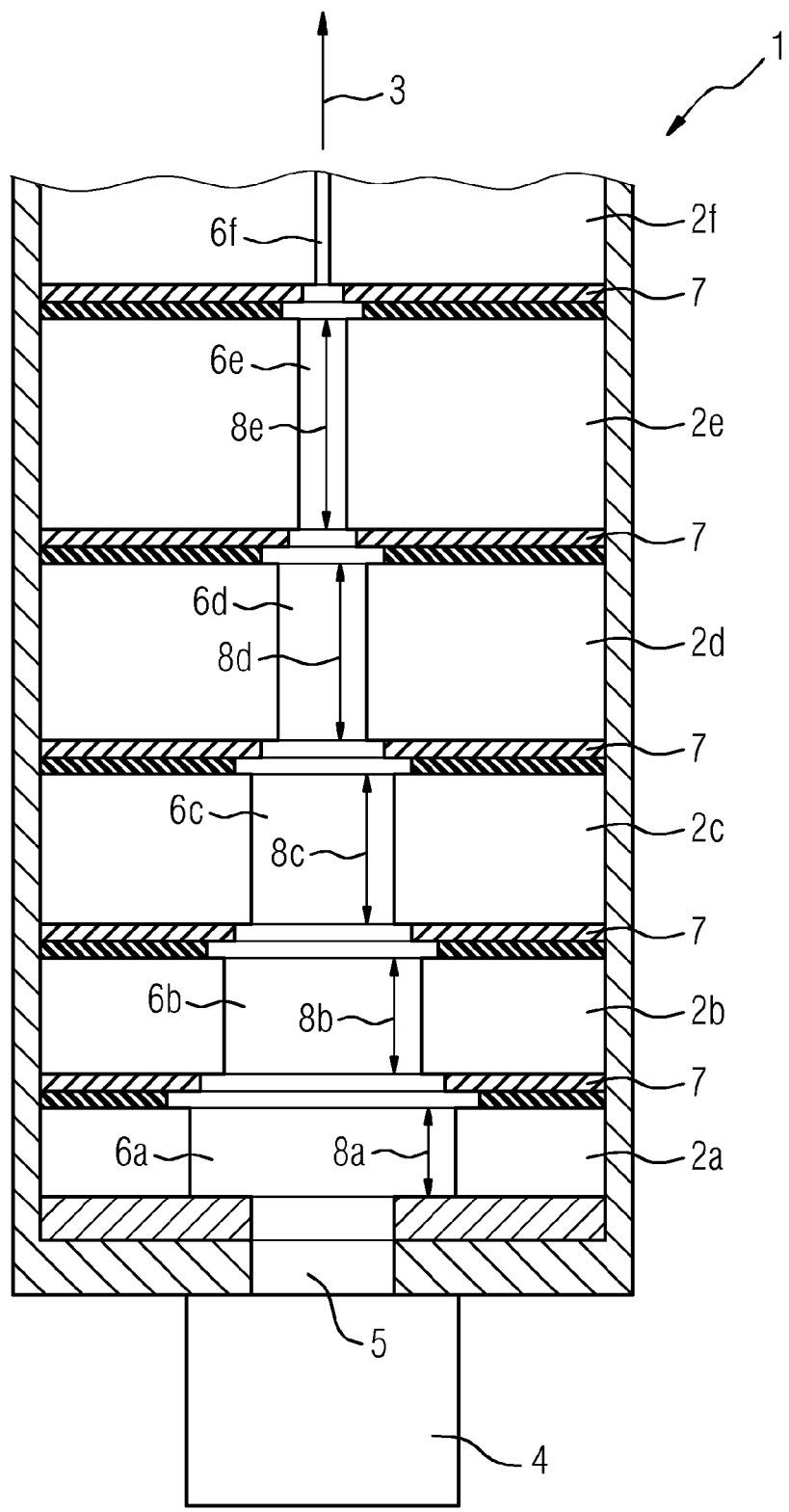

WINDING WITH A COOLING CHANNEL FOR AN ELECTRICAL MACHINE

CROSS REFERENCE TO RELATED APPLICATIONS

This application is the US National Stage of International Application No. PCT/EP2013/062986 filed Jun. 21, 2013, and claims the benefit thereof. The International Application claims the benefit of European Application No. EP12178424 filed Jul. 30, 2012. All of the applications are incorporated by reference herein in their entirety.

FIELD OF INVENTION

The invention relates to a winding for an electrical machine, said winding having multiple conductor bars that are arranged one on top of the other, wherein the conductor bars comprise in each case a cooling slit that is embodied in a downwards direction.

BACKGROUND OF INVENTION

An electrical machine such as by way of example a turbo generator is disclosed in EP 1 742 330 A1. An electrical machine of this type comprises a rotor that can be driven and is mounted in such manner that it can rotate and said rotor is also known as an armature, said electrical machine also comprises a stator that is permanently fixed and surrounds the rotor. The rotor comprises a cylindrical rotor shaft that widens in the shaft longitudinal direction centrally to form a rotor core. The rotor core is also described as an armature core. An exciter winding that can be influenced by a current is arranged on the rotor core. The stator comprises a stator winding. The rotor shaft is coupled to a drive, in particular to a drive shaft of a turbine, so as to generate electrical energy. In this manner, it is possible to set the rotor in a rotary motion with respect to the permanently fixed stator. If a current flows through the rotor winding, a magnetic rotating field is thus generated and said magnetic rotating field induces an electrical voltage in the stator winding. Turbo generators can generate an electrical power between 100 MW and 1500 MW.

Furthermore, it is known to provide the cylinder sleeve of the rotor core with grooves that extend in the shaft longitudinal direction and are spaced apart with respect to one another in the circumferential direction and it is also known to arrange the exciter windings in these grooves. A plurality of conductor bars are stacked one above the other in the grooves for this purpose and said conductor bars are insulated with respect to one another and extend in the shaft longitudinal direction. With respect to the cylinder sleeve surface of the rotor core, a groove breech wedge is provided and inserted into a profiling so as to secure the conductor bars against the centrifugal forces that prevail while the rotor is rotating. In the case of a turbo generator, the aim is to achieve a high as possible electrical power output. The electrical power output of a turbo generator that can be achieved depends on inter alia the magnetic field strength of the magnetic rotating field that is generated by the exciter winding of the rotor. The higher the magnetic field strength, the higher the corresponding electrical power output of the turbo generator.

Since the conductor bars are intensely heated during operation as a result of the electrical currents, it is necessary to cool said conductor bars. For this purpose, it is known to cool the conductor bars using air, gas or water. The conductor bars that are embodied from a conductive material, in particular copper, are provided by means of bore holes, wherein a cooling medium flows through these bore holes. Radially aligned and also axially aligned cooling paths in the conductor bars are known. By way of example, cooling paths are embodied in an axial or radial direction in such a manner that a slit is milled into the conductor bars that are arranged one on top of the other and a cooling medium can flow through said slits. In order to ensure that the maximum possible amount of heat is transferred, these slits are embodied in a stepped manner so that the cooling medium is subjected to a swirling action at the step and the heat transfer coefficient is consequently increased which results in improved cooling efficiency.

In the case of generator rotors that are cooled radially by means of air or hydrogen, the power losses in the rotor conductors in the active part of the rotor are dissipated to the cooling gas by way of radial cooling slits in the conductors. The dissipation of heat is limited as a result of the cooling surface and the cooling gas flow. The conducting temperatures increase in the active part in the groove from below upwards. The hottest conductor lies in the upper region of the groove and limits the permitted rotor current.

It is known to increase the swirling effect of the cooling gases by means of constructing steps in the conductors so as to improve the dissipation of heat in the radial cooling ducts of a radially cooled generator rotor.

SUMMARY OF INVENTION

An object of the invention is to provide a winding that comprises an improved radial cooling arrangement.

This object is achieved by means of a winding for an electrical machine, the winding having multiple conductor bars that are arranged one on top of the other, wherein the conductor bars comprise in each case a cooling slit that is embodied in a downwards direction, wherein the width of the cooling slits decreases in the radial direction from the groove base duct.

In accordance with aspects of the invention, it is consequently proposed to embody the cooling slits in such a manner that the cooling medium that arrives by way of a groove base duct experiences an ever narrowing cross section from conductor bar to conductor bar.

Furthermore, in accordance with aspects of the invention it is proposed to increase the height of the individual conductor bars in the radial direction. This means that the height of the individual conductor bars increases in the radial direction.

In accordance with aspects of the invention, this results in the conductor bars of a rotor groove that are arranged below near to the groove base duct being dimensioned in an even more planar manner and are embodied with larger cooling slit cross sections. Accordingly, the conductors of a rotor groove that are arranged further upwards are dimensioned as taller and embodied having smaller cooling slit cross sections.

The temperatures are slightly increased as a result of restricting the cross sections of the lower conductor bars. In the case of the upper conductors, a similar process occurs but in reverse. The comparatively high temperatures of the conductor bars are decreased as a result of the higher copper cross section. Reducing the cross section of the cooling slit in the groove height has likewise an effect, since as a result of the relatively large cooling slit cross section the flow rate of the cooling gas into the lower conductors decreases which leads to an increase of the temperature of the conductor bars.

Conversely, the temperatures of the above arranged conductor bars decreases as a result of increasing the cooling gas speeds as a consequence of reducing the cooling slit cross sections. This effect is accordingly supported by means of the swirling effect in the cooling slits with the reducing cross section.

As a consequence, in accordance with aspects of the invention, the temperatures of the conductor bars are homogenized in the radial direction. A further effect is that the total current that is permitted to flow through the conductor bar can be increased. This leads inter alia to the total cost for the production and the operation of an electrical machine comprising a winding of this type in accordance with the invention being altogether reduced.

The effect of the winding in accordance with the invention is that the temperatures of the uppermost conductors are reduced. This likewise leads to an increase of the serviceable life of the winding.

The invention is further explained with reference to an exemplary embodiment.

BRIEF DESCRIPTION OF THE DRAWINGS

In the drawing:

The FIGURE illustrates a cross sectional view of a winding in accordance with the invention for an electrical machine.

DETAILED DESCRIPTION OF INVENTION

The cross sectional view that is illustrated in the FIGURE illustrates a part of a winding 1 for an electrical machine. The winding comprises multiple conductor bars 2a, 2b, 2c, 2d and 2e that are arranged one on top of the other. These conductor bars 2a to 2e are arranged one on top of the other in a radial direction 3. During operation, a cooling medium such as for example air or a gas flows through a groove base duct 4 and at that location through cooling openings 5 through the first conductor bar 2a. The first conductor bar 2a comprises a first cooling slit 6a having a width. An insulation 7 is arranged between the first conductor bar 2a and the second conductor bar 2b. Likewise, an insulation is arranged between the second conductor bar 2b and the third conductor bar 2c and also between the remaining conductor bars 2d etc. that are arranged one on top of the other. The width of the cooling slits 6a, 6b, 6c, 6d, 6e and 6f reduces in the radial direction 3. This means that the flow cross section for the flow medium becomes increasingly narrower in the radial direction. The flow cross section within the cooling slits 6a, . . . , 6f is known.

A second fundamentally technical feature of the conductor bars 2a to 2e is that the height 8a, 8b, 8c, 8d, 8e and 8f increases. This means that the conductor bar 2a comprises the smallest height 8a. The height increases in each case in the radial direction by a value between 5% and 80%.

The invention claimed is:

1. A winding for an electrical machine, said winding comprising:
multiple conductor bars that are arranged one on top of the other above a groove base duct,
wherein the conductor bars comprise in each case a cooling slit that is embodied in a downwards direction,
wherein the width of the cooling slits reduces in the radial direction from the groove base duct,
wherein the height of the individual conductor bars increases in the radial direction from the groove base duct,
wherein cooling slit cross sections decrease in the radial direction from the groove base duct.

2. The winding according to claim 1, further comprising insulating strips arranged between the conductor bars.

3. The winding according to claim 1, wherein each transition between adjacent cooling slits is characterized by a step transition in the widths.

4. The winding according to claim 1, wherein the cross sections and height of each slit are configured to homogenize temperatures of the conductor bars.

* * * * *